United States Patent [19]

Brooks et al.

[11] Patent Number: 4,712,113

[45] Date of Patent: Dec. 8, 1987

[54] THERMAL TRANSFER RIBBON MECHANISM AND RECORDING METHOD

[75] Inventors: Ralf M. Brooks, Waterloo; Brian P. Connell, Elmira; Dennis T. Sonnenburg, Waterloo; Stefan J. Pagowski, Kitchener, all of Canada

[73] Assignee: NCR Canada Ltd - NCR Canada Ltee, Mississauga, Canada

[21] Appl. No.: 886,488

[22] Filed: Jul. 17, 1986

[51] Int. Cl.[4] .................. G01D 15/10; B41J 33/34; G11B 15/32

[52] U.S. Cl. .................. 346/1.1; 346/76 PH; 346/136; 242/179; 242/188; 242/190; 400/232; 400/234; 400/235

[58] Field of Search .................. 346/76 PH, 1.1, 136; 400/234, 235, 232; 242/179, 188, 190

[56] References Cited

U.S. PATENT DOCUMENTS

| | | | |
|---|---|---|---|
| 4,088,214 | 5/1978 | Shindo et al. | 400/120 |
| 4,385,330 | 5/1983 | Serafini | 360/71 X |
| 4,458,253 | 7/1984 | Goff, Jr. et al. | 346/76 PH |
| 4,471,362 | 9/1984 | Murayama et al. | 346/76 PH |
| 4,481,518 | 11/1984 | Inui et al. | 346/76 PH |
| 4,495,507 | 1/1985 | Moriguchi et al. | 346/76 PH |
| 4,507,667 | 3/1985 | Tsuboi | 346/76 PH |
| 4,509,060 | 4/1985 | Uozumi | 346/76 PH |
| 4,531,132 | 7/1985 | Wilkinson | 346/76 PH |
| 4,536,772 | 8/1985 | Isogai | 346/76 PH |
| 4,541,042 | 9/1985 | Kohashi | 346/76 PH |
| 4,568,950 | 2/1986 | Ross et al. | 346/76 PH |

OTHER PUBLICATIONS

U.S. patent application Ser. No. 561,449, filed Dec. 14, 1983, Ralf M. Brooks et al., inventors, entitled, "Method and Apparatus for Thermally Printing Data in Special Fonts on Documents Like Checks".

*Primary Examiner*—Clifford C. Shaw
*Assistant Examiner*—Gerald E. Preston
*Attorney, Agent, or Firm*—Wilbert Hawk, Jr.; Albert L. Sessler, Jr.

[57] ABSTRACT

A thermal printing apparatus is disclosed in which ribbon advancing mechanism including a supply spool and a take-up spool operated by a stepping motor is disclosed. Mechanism is provided for reversing the direction in which the take-up spool is driven by a specified amount during the printing cycle, in order to provide ribbon slack, so as to avoid smudging of the transferred ink on the receiving document and possible ribbon breakage during printing. The circumference of the accumulated ribbon on the take-up spool at any given time is considered in determining the number of steps and the step rate of the stepping motor in the reverse direction which must be taken in order to produce the desired amount of ribbon slack and slack take-up.

17 Claims, 14 Drawing Figures

FIG. 10

| SLACK COUNT | OFFSET | RIBBON STEP TIME TABLE |
|---|---|---|
| 10 | 0 | 20.0 mSec |
| 11 | 1 | 18.2 mSec |
| 12 | 2 | 16.7 mSec |
| 13 | 3 | 15.4 mSec |
| 14 | 4 | 14.3 mSec |
| 15 | 5 | 13.3 mSec |
| 16 | 6 | 12.5 mSec |
| 17 | 7 | 11.8 mSec |
| 18 | 8 | 11.1 mSec |
| 19 | 9 | 10.5 mSec |
| 20 | 10 | 10.0 mSec |
| 21 | 11 | 9.52 mSec |
| 22 | 12 | 9.09 mSec |
| 23 | 13 | 8.70 mSec |
| 24 | 14 | 8.33 mSec |

THERMAL TRANSFER RIBBON MECHANISM AND RECORDING METHOD

BACKGROUND OF THE INVENTION

Thermal printing apparatuses have been developed for many uses, including the printing of various information in various type fonts on documents such as plain paper check documents, using one-time thermal transfer ribbons. The thermal transfer ribbons may contain ink of the optically readable type (OCR) or may provide magnetic ink which is machine readable (MICR).

A thermal printing apparatus capable of printing in a plurality of type fonts, such as font E-13B, is shown in U.S. Pat. No. 4,531,132, issued July 23, 1985, inventor Philip J. Wilkinson, assigned to the assignee of the present application.

Another thermal printing apparatus capable of printing in specific styles of fonts such as E-13B or OCR is shown in U.S. patent application Ser. No. 561,449, filed Dec. 14, 1983, inventors Ralf M. Brooks et al., assigned to the assignee of the present application.

The printer mechanisms which form the subject-matter of the above-referenced patent and application have been developed to print various type fonts used in financial transactions on plain paper documents such as checks using a "one-time" thermal transfer ribbon. To obtain the document throughput or speed necessary to make the item processing machines in which the printer mechanisms are to be installed commercially feasible, it is necessary that the financial font field be printed in a parallel fashion. Although the check or other document moves into the printing station in a horizontal direction, the "line" thermal printhead of the thermal printer moves in the vertical direction during the printing operation, while the check or other document remains stationary. This movement of the printhead imposes certain requirements upon the operating means for the thermal transfer ribbon in order to avoid smudging of the transferred ink on the document being printed upon, and possible breakage of the ribbon.

SUMMARY OF THE INVENTION

The present invention relates to thermal transfer ribbon mechanism, and more particularly relates to such mechanism which is capable of reverse movement of the ribbon drive means to provide slack in the ribbon when such is desirable.

In accordance with a first embodiment of the invention, a recording apparatus comprises, in combination: a track in which a document to be recorded upon may travel; a platen engageable with said document when said document is in recording position; a movable recording head capable of moving in operative relation to said platen in a first recording direction and in a second return direction, for recording on said document; a ribbon take-up spool, a ribbon supply spool, and an ink donor ribbon extending therebetween and extending across said recording head and the document to be recorded upon; stepping motor means for driving said ribbon take-up spool; sensing means for sensing and measuring the movement of said ribbon from said supply spool to said take-up spool; and control means coupled to said sensing means for controlling the operation of said stepping motor means and said recording head, and including means for reversing the movement of said take-up spool to provide a predetermined amount of slack in said ribbon during each printing operation, and also including means for determing the number of steps taken by said stepping motor means in a reverse direction by utilizing the number of steps taken by said stepping motor means in a plurality of movements of given distance of the ribbon measured by said sensing means during recording operation, said slack being provided to prevent smudging of the transferred ink on the document by the ribbon or breaking of the ribbon during the movement in recording direction by said recording head.

In accordance with a second embodiment of the invention, a method of thermal recording embodying a thermal transfer ribbon carrying ink material which is transferred to a document by thermal means comprises the following steps: advancing the ribbon a predetermined amount in a recording direction by a stepping motor during each recording operation to provide a fresh ribbon for the transferral of ink to a document to be recorded upon; sensing and measuring the number of steps of the stepping motor required for movement of the ribbon a given distance in said recording direction; and reversing the ribbon by a predetermined amount during each recording cycle by operation of the stepping motor in a reverse direction a number of steps determined by utilizing the number of steps taken by the stepping motor for movement of the ribbon a given distance in said recording direction, to provide ribbon slack for the prevention of document smudging and ribbon breakage It is accordingly an object of the present invention to provide a ribbon mechanism capable of controlling the ribbon to prevent ink smudging on the receiving document and ribbon breakage Another object is to provide a thermal transfer ribbon mechanism capable of controlling the ribbon to provide slack in the ribbon during a portion of a printing cycle and to take up that slack during a subsequent portion of the printing cycle.

Another object is to provide means for peeling back a thermal transfer ribbon from a document printed upon subsequent to said printing so as to effect proper separation of the ribbon from the document.

Another object is to provide an ink ribbon mechanism capable of controlling the ribbon to provide slack in the ribbon during a portion of the printing cycle by reversing the movement of the ribbon by an amount based upon a measurement of the amount of ribbon travel during a portion of a previous printing cycle.

Another object is to provide a method of thermal recording employing a thermal transfer ribbon which includes advancing the ribbon the same amount for each printing cycle and reversing the ribbon a predetermined amount during each cycle to prevent ink smudging on the receiving document and ribbon breakage.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 10 shows the ribbon step time lookup table which is employed in controlling movement of the ribbon.

DESCRIPTION OF THE PREFERRED EMBODIMENT

Figure 1:
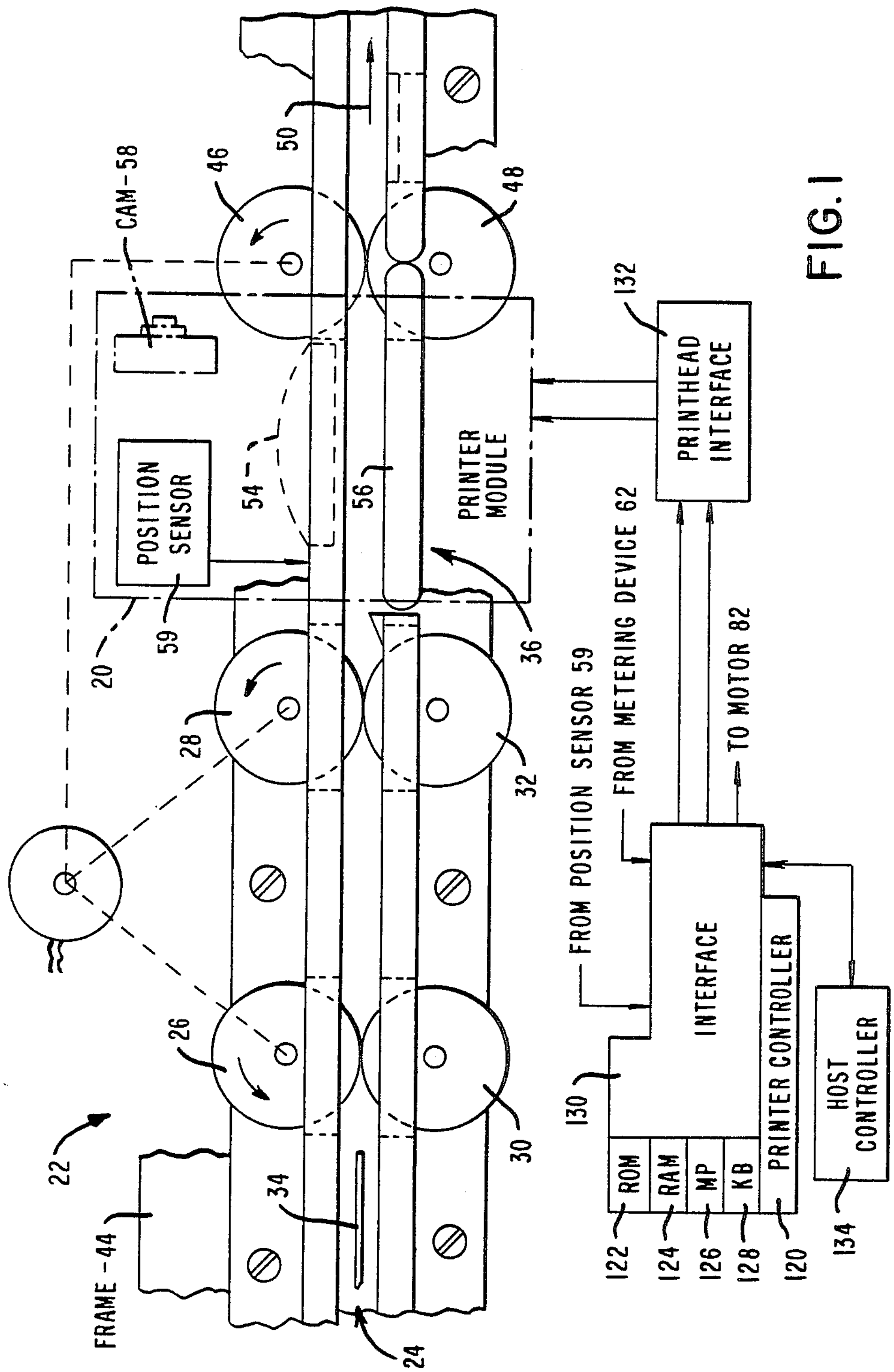
FIG. 1 is a plan view, in diagrammatic form, showing a printing apparatus comprising the present invention.

Referring now to FIG. 1 of the drawings, shown there is a diagrammatic plan view of a printing apparatus 20 incorporated into a business machine such as an encode and sort unit 22, which is capable of printing appropriate identification or other indicia on checks or other documents, and of performing a sorting operation on said documents. The printing apparatus could, of course, be used in other machines than the encode and sort unit 22, if desired.

Figure 2A:
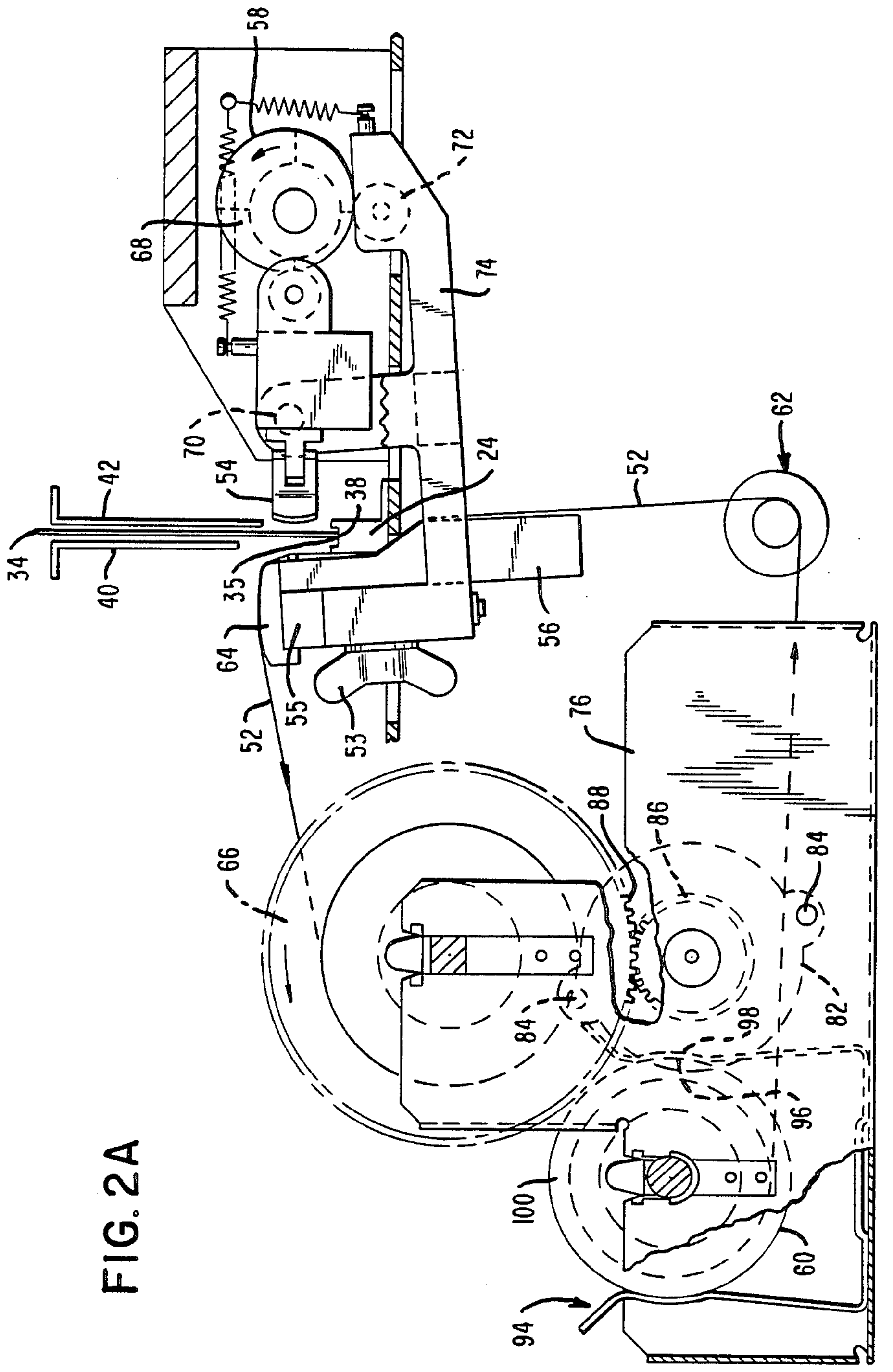
FIG. 2A is a sectional view showing the print head and platen operating mechanism, as well as the mechanism for advancing the thermal transfer ribbon from a supply spool to a take-up spool.

The printer module 20 is shown in dashed lines in FIG. 1 so as to orient it in relation to the encode and sort unit 22, which includes a document track 24 and transport rollers 26, 28 and 46 which cooperate with associated pinch rollers 30, 32 and 48, respectively, to provide a means for moving a document such as a check 34 to a print station 36 in the unit 22. The top edge of the check 34 is seen in FIG. 1, and it is fed on its lower edge 35 (FIG. 2A), with said lower edge gliding over the trough portion 38 of the track 24 which also includes the vertical side walls 40 and 42 (FIG. 2A). These side walls 40 and 42 are secured to the frame 44 (shown diagrammatically) and are spaced apart to receive the documents therebetween and to guide a document such as a check 34 from a hand drop or a hopper feeder (not shown) to the print station 36 where the printer module 20 is located, and where the check 34 is controllably stopped, after being sensed by a position sensor 59. The check 34 and a thermal transfer ribbon 52 (FIG. 2A) are then sandwiched between a platen 54 and a "line style" thermal printhead 56 by action of a cam 58 which moves the platen 54 out into the track 24 to establish pressure contact between the check 34, the ribbon 52 and the printhead 56.

Figure 4:
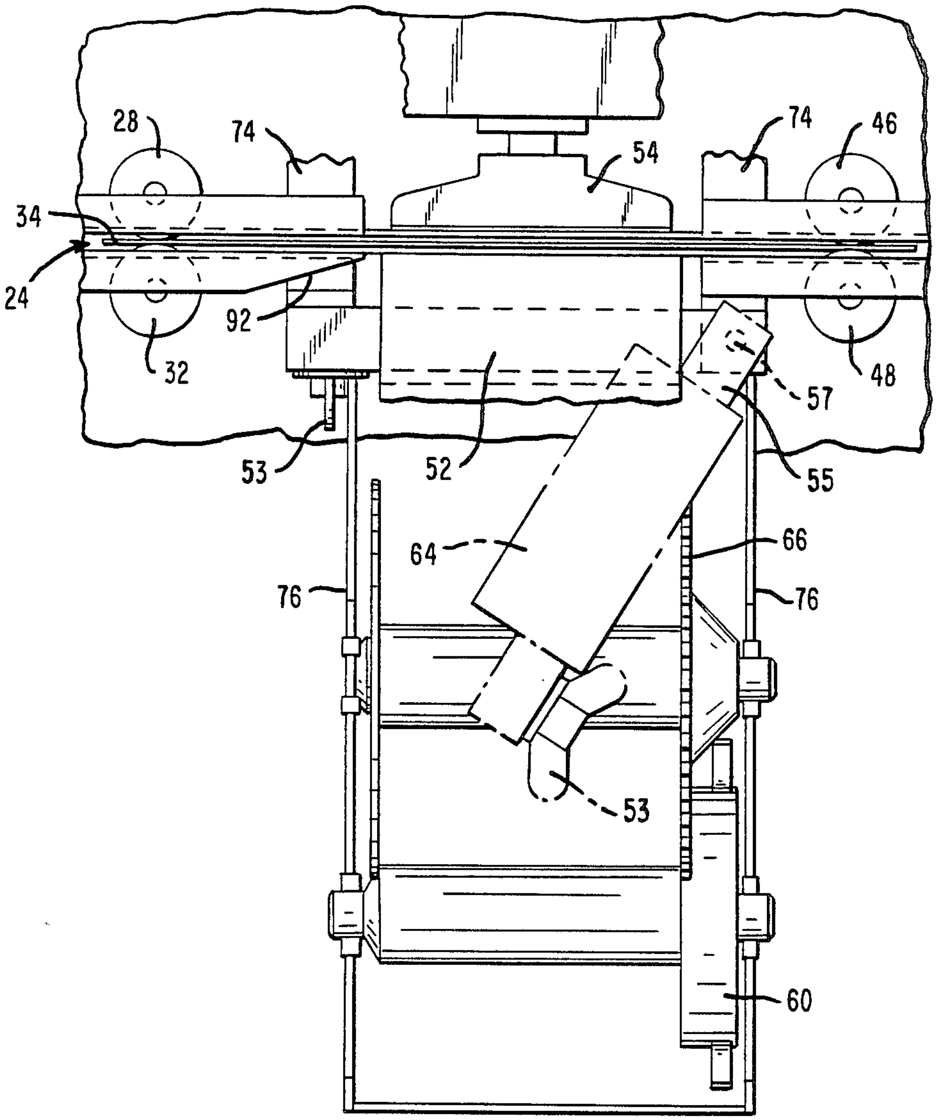
FIG. 4 is a plan view of the printing apparatus showing the print head, the platen and the ribbon supply and take-up spools.

The printhead 56 is adjustably mounted on a gate 55 which is pivotally mounted by means of a pivot 57 on a carrier 74, which will subsequently be described in greater details. A more detailed showing of the pivotal mounting of the gate 55 may be found in the previously-cited U.S. patent application, Ser. No. 561,449. FIG. 4 includes a dashed-lined showing of the gate 55 and printhead 56 in open position. Securing means such as a headed screw 53 is employed to retain the gate 55 and printhead 56 in closed position.

The printer module 20 is utilized to print information such as a "courtesy amount" on the check 34. After printing has been completed, the check 34 is moved from the print station 36 by drive roller 46 and its associated pinch roller 48, and is moved in the downstream direction shown by arrow 50, to other elements which are not important to an understanding of this invention. If multiple lines of printing are to take place upon a given document 34, said document may be advanced slightly, in the direction of arrow 50, to print such additional data.

FIGS. 2A, 2B, 2C and 2D show a number of views of the printer module 20 during various stages of operation. In FIG. 2A, the platen 54 and the printhead 56, both controlled by the cam 58, are shown in pre-printing or "home" positions, with the document 34 positioned therebetween in the track 24. A detailed description of the manner in which the cam 58 controls the movements of the platen 54 and the printhead 56 during the various stages of printer operation may be found in the previously-cited U.S. patent application Ser. No. 561,449. FIG. 2A also shows the thermal transfer ribbon 52 extending from a supply spool 60 around a metering device 62, up between the track 24 and the printhead 56 and over a guide cap 64 having a smooth upper surface and located on the printhead 56, to a take-up spool 66, as will subsequently be described in greater detail.

Figure 2B:
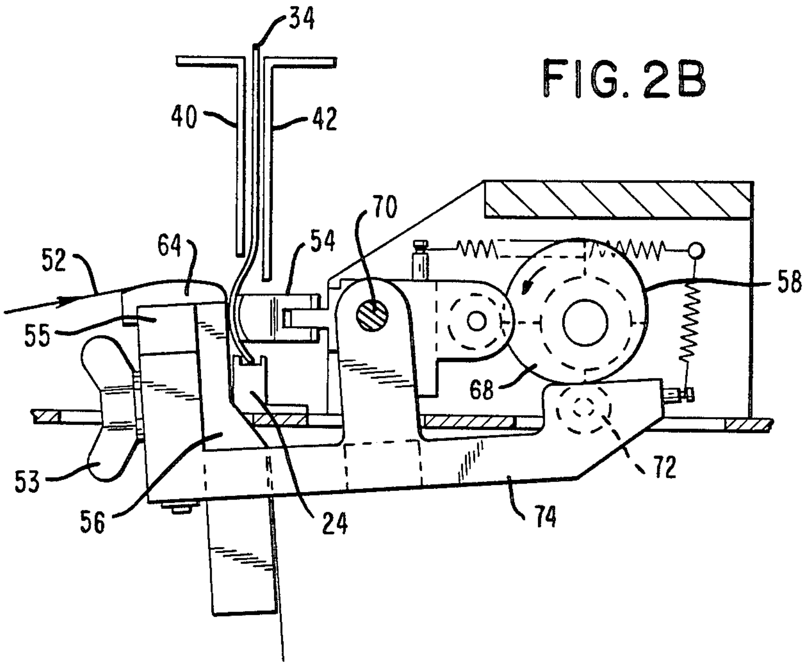
FIGS. 2B, 2C and 2D are views similar to FIG. 2A, showing the print head and platen operating mechanism and the mechanism for advancing the thermal transfer ribbon at different points in the operating cycle of the printing apparatus.

FIG. 2B shows the position of the platen 54 after a rise sector 68 of the cam 58 has extended it to its maximum travel. The thermal transfer ribbon 52 and the check 34 are sandwiched between the platen 54 and the thermal printhead 56. At this point, the ribbon 52 is backed up to provide slack to prevent smearing of the transferred ink and/or breakage of the ribbon. Continued movement of the cam 58 will cause the thermal printhead 56 to move upward during a printing operation, via a carrier 74.

Figure 2C:
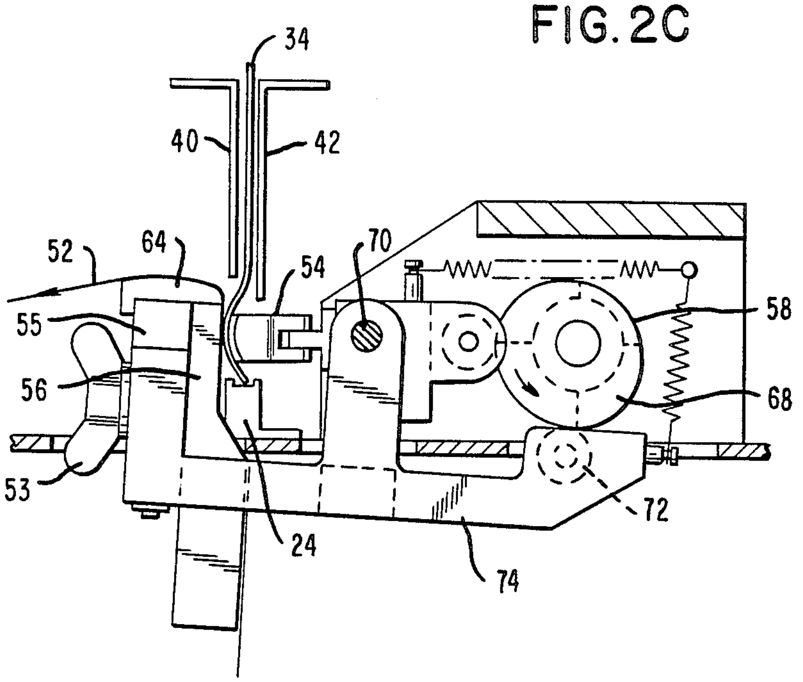

FIG. 2C shows the position of the platen 54, the printhead 56 and the cam 58 at the end of the printing operation. The printhead 56 has been pivoted about the shaft 70 to describe an arcuate motion during the printing operation due to the engagement of the sector 68 of the cam 58 with the follower 72 on the carrier 74 of the printhead 56, said carrier being pivotally mounted on the shaft 70. At the end of the printing operation, take-up of the ribbon slack is commenced.

Figure 2D:
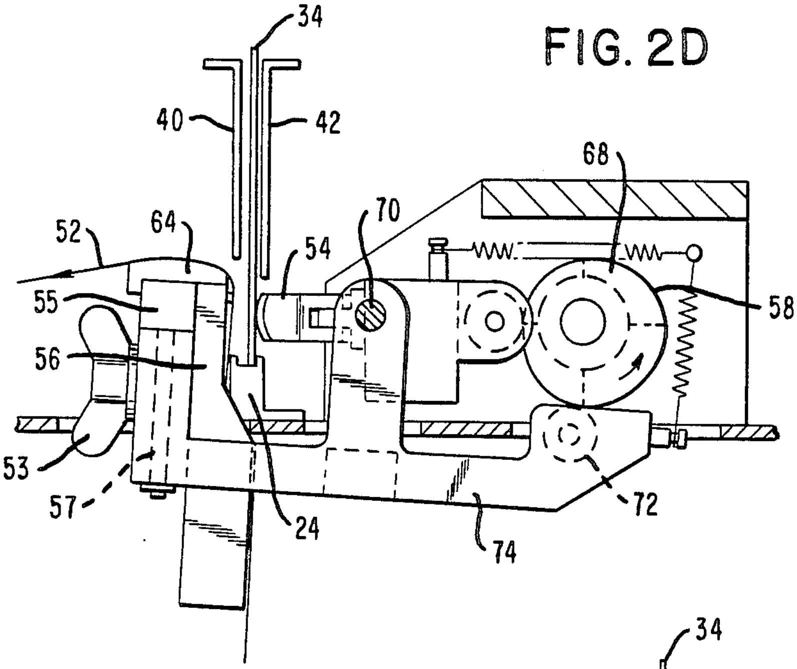

FIG. 2D shows the position of the various elements after the platen 54 has been retracted from printing position. At this time, slack in the ribbon 52 is still being taken up. From the position of FIG. 2D, the printhead 56 returns to the "home" position of FIG. 2A. Once the printhead 56 reaches the home position, all of the ribbon slack will have been taken up, and the ribbon advance operation may be started.

It should be noted that the printer mechanism described above differs from conventional printer mechanisms in which the record medium and the ribbon are moved during the printing operation. Such movement of paper during printing is unacceptable for applications in which documents such as checks are transported in a horizontal direction at high speeds on transports and are halted and imprinted by a printhead moving in a vertical direction. If the document is not properly seated in the bottom of the track, unwanted document jams may occur. The mechanism of the present invention for advancing the thermal transfer ribbon used in such a printing apparatus has been designed to accommodate the specific requirements of the movement of the printhead 56.

Referring to FIGS. 2A and 4, it will be noted that the ribbon supply spool 60 and the ribbon take-up spool 66 are mounted for rotational movement in a frame 76. Both spools 60 and 66 are removable from the frame. The take-up spool 66 is driven through a 96 to 15 gear ratio in the illustrated embodiment by a 7.5 degree permanent magnet stepper motor 82, which is secured to the frame 76 by screws 84. A pinion 86 driven by the motor 82 engages a gear 88 to effect the driving of the spool 66. Since the line of force is tangent to the intersection of the pinion 86 and gear 88, the motor mounting screws 84 are positioned along a line which is 90 degrees from the line of force to allow the pinion 86 the capability of flexing, so that if there is any mismatch between the gear teeth, it will easily be absorbed. This 90 degree angle is further modified by a 20 degree pressure angle to accommodate the involute profile of the gear teeth.

To load the ribbon into the ribbon mechanism, the supply spool 60 is first dropped into the lower bearings of the frame 76, the thermal printhead 56 and the gate 55 are swung open on pivot 57, and the ribbon 52 is passed around the metering device 62, and up over the top of the thermal protection cap 64, whereupon the gate 55 is closed. The ribbon 52 is then guided onto the take up spool 66. The stepper motor 82 advances the take-up spool 66 until a predetermined number of counts have occurred on the metering device. In order to achieve the higher document throughputs required in a typical encode and sort system, it is necessary to ramp controllably the stepper motor 82 up to high step rates, so that motor stall does not occur. A braking action is applied to the feed spool 60 to prevent it from unwinding excessively. In the illustrated embodiment, this braking action is supplied by a metal leaf spring brake 94, which is secured to the frame 76, and which includes two arcuate portions 96, 98 which are urged into engagement with a cylindrical portion 100 of the supply spool 60.

In a thermal transfer printing process, heat from a thermal print head element is applied to the back or substrate side of a paper or plastic film, which is in close pressure contact with a document such as a bank check 34, for example. The ink side of a ribbon such as the ribbon 52 is in close contact, under pressure, with the paper surface of the receiving check. The temperature pulse from the thermal print head is conducted through the ribbon and locally raises the ink temperature above its melting point. The molten ink penetrates into the paper fibers and resolidifies. Since the paper surface of the check is usually much rougher than the smooth ribbon substrate, the resolidified ink adheres preferentially to the paper when the ribbon is peeled back from the paper.

Manufacturers of thermal transfer ribbons generally recommend a conservative peel-back angle of approximately 135 degrees in order to effect proper ribbon separation from the paper being recorded upon, and to insure that only a negligible amount of ink is left on the ribbon substrate in the area corresponding to the energized thermal print head elements. If the peel-back angle is not large enough, the bonding of the ribbon to the paper can be strong enough that the document may actually be lifted out of the track when the ribbon is advanced, or excessive ink may remain on the ribbon substrate, resulting in voids in the print.

Figure 3:
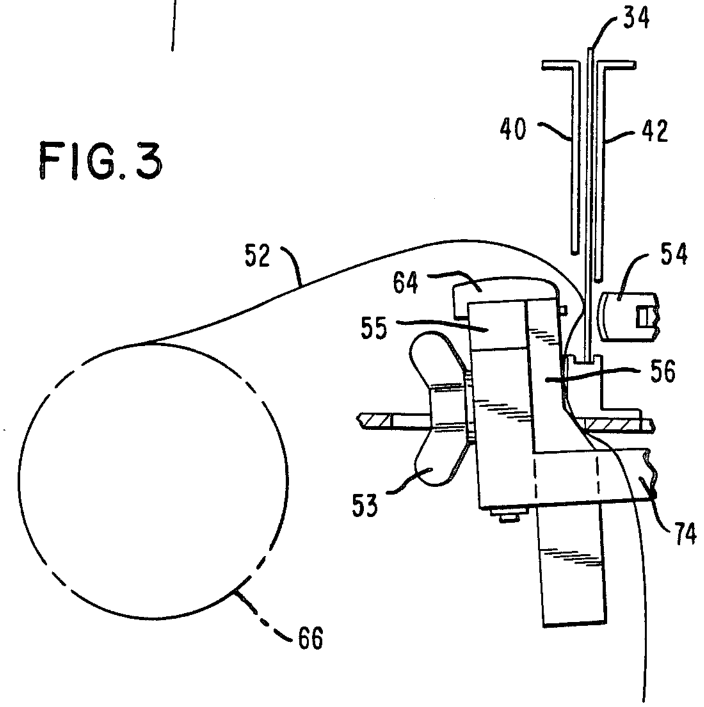
FIG. 3 is a view similar to FIGS. 2A to 2D, showing a portion of the printing apparatus after the ribbon take-up roll has been rotated in a reverse direction to provide slack in the thermal transfer ribbon just prior to the printing operation.

It is possible to obtain, or at least approach, such an optimal peel-back angle in a conventional thermal printer, since both the paper and the ribbon are moving past the thermal printhead, and the ribbon can be peeled backward as the paper passes onward. On the other hand, the ideal peel-back angle is quite difficult to obtain in a printing apparatus, such as the present one, in which the document does not move in the same direction as the thermal printhead. The following design guidelines arise from the ribbon peel-back requirements: first, the ribbon should be fed through the printing station from bottom to top to allow the ribbon to be peeled away from the document in as large an angle as possible; second, the thermal printhead should be located as low as possible below the printed line after the printing operation in order to aid peel-back; and third, the thickness of the protective cap 64 should be no more than necessary. This relationship is represented diagrammatically in FIG. 3, in which the printhead 56 has been shifted downwardly so as to increase the possible angle between the ribbon 52 and the check 34 as the path of the ribbon extends across the cap 64 and back to the take-up spool 66. In this design, the thermal printhead elements are located approximately six degrees below the center of the printed line, which permits a peel-back angle of approximately 90 degrees, which has been determined experimentally to be acceptable. It will be seen from the various figures of the drawings that the thermal printhead 56 could not be lowered appreciably from the position in which it is shown without causing interference with the document track 24.

The arrangement by which the peel-back of the ribbon 52 is accomplished is shown in FIG. 2A. As previously mentioned, the take-up spool 66 is driven through a 96 to 15 gear ratio in the illustrated embodiment by the stepper motor 82. At the appropriate time, after the thermal printhead 56 has returned to its home position, the motor 82 causes the take-up spool 66 to rotate in a counterclockwise direction, peeling the ribbon 52 off of the document 34. The ribbon 52 is then advanced by further counterclockwise rotation of the take-up spool 66 to its next unused location, and the printed-upon document 34 is removed from the print station 36. The timing of the ribbon peel-back and the physical location of the thermal printhead 56 when the peel-back is started are key features which result in successful peeling of the ribbon 52 from the document 34.

Figure 5:
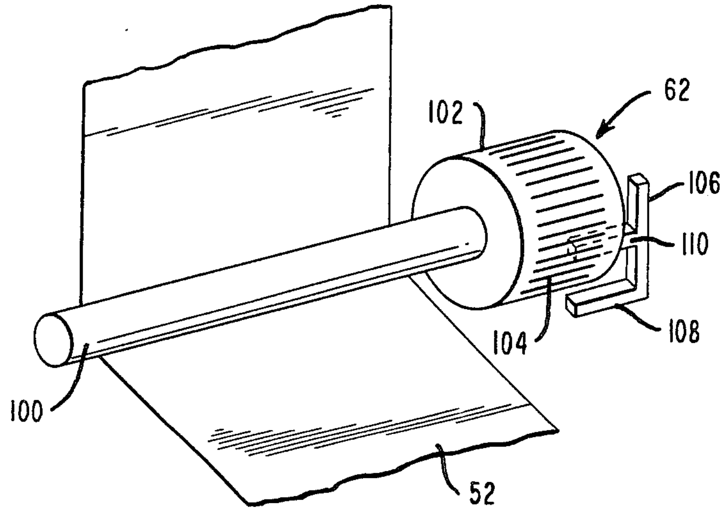
FIG. 5 is a fragmentary perspective view, showing the thermal transfer ribbon and the sensing mechanism for measuring the travel of the ribbon.

Shown in FIG. 5 is the metering device 62 which is employed to measure the movement of the ribbon 52. A free-running roller 100 is rotatably mounted in the framework of the printing apparatus in a position in which it engages the ribbon 52 and is driven thereby. The roller may be made from any suitable material, such as a plastic. Fixed to the roller 100 for rotation therewith is a metering cup 102, having well-defined "timing" lines 104 engraved or otherwise placed thereon about its circumference. A suitable sensing device 106, which may include a paired photodiode 108 and a phototransistor 110, is used to monitor the motion of the metering roller 100 and thus the motion of the ribbon 52. As illustrated in FIG. 2A, in order to maintain proper contact between the ribbon 52 and the roller 100, said roller is placed directly beneath the thermal printhead 56, so that at least ninety degrees of wrap of the ribbon 52 around the roller 100 is obtained.

As previously described in connection with FIGS. 2A, 2B, 2C and 2D, the motion of the thermal printhead 56 is upward during the printing operation. After the ribbon 52 has been advanced to an unused portion, the ribbon 52 is taut, from the feed roll 60, around the metering device 62, around the thermal printhead 56, over the smooth upper surface of the cap 64, to the take-up roller 66. If no corrective action is taken to slacken the tension on the ribbon 52 prior to printing, the ribbon 52 can be dragged upward by the upward motion of the thermal printhead 56, causing unacceptable smearing of the ink on the document 34, as well as possible breakage of the ribbon 52.

In order to prevent this possible document smearing and ribbon breakage, the take-up spool 66 is "backed-up" prior to initiation of the print cycle of the cam 58. This provides slack in the ribbon 52 to enable the thermal printhead 56 to move upward without interference. It is necessary to determine the number of steps of the ribbon motor 82 which must be made at any time to produce the desired amount of slack, since a given number of steps of the ribbon motor 82, when the radius of ribbon on the take-up spool 66 is relatively small, will provide a shorter length of ribbon 52 than when the radius of the collected ribbon on the take-up spool is relatively large.

In the illustrated embodiment, the total rise of the thermal printhead 56 during a cycle of printing is eight millimeters, and the pitch between character lines on the ribbon is four millimeters. A four millimeter length of ribbon 52 is measured by the metering device 62. Therefore in order to obtain the desired eight millimeters of slack, the number of required motor steps to advance the ribbon eight millimeters can be determined by multiplying by two the number of motor steps required to advance the ribbon by four millimeters as determined by the metering device 62. In actual practice in the illustrated embodiment, the numbers of steps for a number of four-millimeter advancements are stored and averaged, and then multiplied by two in order to compute the number of motor steps in the reverse direction required to provide the desired eight-millimeter ribbon slack.

If a 96:15 gear ratio between take-up spool 66 and motor 82 is assumed, then each 7.5 degree step of the ribbon motor 82 translates into a 1.17 degree step of the take-up spool 66. If it is further assumed that the ribbon on the take-up spool 66 has a maximum diameter of 80 millimeters and a minimum diameter of 33 millimeters, then the maximum and minimum numbers of steps required to advance the ribbon by four millimeters can be calculated. In the case of the maximum take-up spool diameter of 80 millimeters, the ribbon travel per step equals PI times (80)(1.17/360), equals 0.817 millimeters per step, so that 4/0.817 equals 4.90 steps per four-millimeter ribbon advancement. Similarly, for a minimum take-up spool outside diameter of 33 millimeters, the ribbon travel per step equals PI times (33)(1.17/360) equals 0.337 millimeters per step, so that 4/0.337 equals 11.87 steps per four-millimeter ribbon advancement. Therefore the number of steps required to advance the ribbon by four millimeters will vary between five and twelve steps. These values will set the lower and upper limits for the number of required motor steps and will be used in the Calculate Ribbon Motion Parameters routine of FIG. 6A.

It will thus be seen that the number of motor steps required to move the ribbon 52 a fixed distance (i.e. four mm. or eight mm.) will vary in accordance with the amount of ribbon on the take-up spool 66. It will also be seen that if the time between motor steps at which the ribbon motor 82 steps the take-up spool 66 remains constant, the rate at which the ribbon 52 moves along the ribbon path will increase as the outside diameter of the ribbon 52 on the take-up spool 66 increases. However, what is required is to maintain relatively constant time ribbon advance regardless of the outer diameter of the ribbon on the take-up spool 66.

The following requirements should therefore be included in a design for controlling the amount of reverse stepping of the motor 82 to produce the desired slack in the ribbon 52.

1. Automatically determine the number of ribbon motor steps required to advance the ribbon by four millimeters on a continual basis. Note that this number will be dependent upon the outside diameter of the take-up spool 66.

2. Based upon the number of steps used to advance the ribbon by four millimeters, calculate the number of steps required to achieve the eight millimeters of ribbon slack prior to printing, and the eight millimeters of ribbon slack take-up after printing.

3. Maintain a relatively constant ribbon advance speed by varying the speed of the ribbon step motor 82. Based upon the number of steps required to achieve eight millimeters of ribbon slack, a ribbon step time can be computed such that the ribbon advance occurs in essentially a constant time period.

FIG. 1 includes a block representation of the means for controlling a printing apparatus which embodies the present invention. A printer controller 120 is generally conventional, and does not form a part of the present invention. The necessary instructions for operating the printer module 20 may be stored in a read-only memory (ROM) 122, or they may be loaded daily into a random access memory (RAM) 124 from some supplemental storage, such as a tape or disc file (not shown). A microprocessor (MP) 126 is used to process the instructions, and a keyboard (KB) 128 is used to make selections as to the type of font and as to the numerals to be used for printing and to control the printer module 20. An interface 130 is used to provide interconnections among the various components shown, including a printhead interface 132, and also to interface the printer controller 120 with a host controller 134 associated with the encode and sort unit 22 or with some host system (not shown) In addition, the interface 130 receives signals from the metering device 62 and communicates these to the microprocessor 126, as well as communicating commands from the microprocessor 126 to the ribbon stepping motor 82.

The firmware used to control the ribbon mechanism makes use of seven registers within the microprocessor 126. Each register is given a name which reflects its function or usage within the control firmware. A description of each of these registers appears below.

The PULSE COUNT register is used to count the pulses being generated by the ribbon metering device 62 while the ribbon 52 is being advanced. If, for example, the metering device 62 includes a roller 100 having an outside diameter of ten millimeters and a cup 102 which generates 90 pulses per revolution, the number of pulses generated by the movement of approximately four millimeters of ribbon past the metering device 62 is given by the computation (4 mm*90)/10PI equals 11.5 pulses, which is rounded up to 12 pulses.

The FEED COUNT register is used to count the number of motor steps required to advance the ribbon 52 by four millimeters.

Three registers which are used to maintain a history of prior FEED COUNT values are called FEED HISTORY, FEED HISTORY+1 and FEED HISTORY+2. These registers represent respectively, during operation of the ribbon control cycle, the three preceding feed counts. Thus as a new feed count is measured, the value in the FEED HISTORY+1 register is transferred to the FEED HISTORY+2 register, the value in the FEED HISTORY register is transferred into the FEED HISTORY+1 register, and the value of the FEED COUNT register is transferred to the FEED HISTORY register. At the beginning of each ribbon control cycle, the feed history is updated. The contents of these three registers are averaged with the contents of the FEED COUNT register to obtain an average of the last four FEED COUNT values.

The SLACK COUNT register is used to store the number of ribbon motor steps required to input and then remove eight millimeters of ribbon slack. The slack count is two times the average FEED COUNT.

The STEP COUNT register is used to count the ribbon motor steps when ribbon slack is being input or removed. The value contained in the SLACK COUNT register is copied into the STEP COUNT register before stepping of the ribbon motor 82 is started. Following each step, the STEP COUNT register is decremented by one. When the STEP COUNT register equals zero, stepping is halted.

The RIBBON STEP TIME register is used to set the time period between ribbon motor steps. The value stored in this register is obtained from the ribbon motor step time lookup table (FIG. 10), where the precalculated step times are stored. By increasing the time between steps as the outside diameter of the take-up spool 66 increases, the speed at which the ribbon 52 moves over the metering device 62 remains relatively constant.

At the start of each new ribbon control cycle, the SLACK COUNT and RIBBON STEP TIME registers are updated. The slack count is the number of steps required to take up eight millimeters of ribbon 52 onto the take-up spool 66. The ribbon step time represents the time period between successive steps of the ribbon motor 82, thereby dictating the speed at which the ribbon 52 moves along the ribbon path (FIG. 2A).

The "Feed Ribbon" subroutine (FIG. 9), which will subsequently be described in detail, counts the number of motor steps taken each time the ribbon is advanced four millimeters. This motor step count is passed out of the "Feed Ribbon" subroutine via the FEED COUNT register. By keeping record of past FEED COUNT values, an average FEED COUNT value can be computed. This value will gradually decrease as the outside diameter of the take-up spool 66 increases. The SLACK COUNT is computed by multiplying the average of the last four feed counts by two. An advantage in computing the slack count in this fashion is that the averaging operation acts as a "filter" to minimize the effect of an erroneous feed count reading due to slippage of the ribbon 52 over the ribbon metering device 62.

The speed at which the take-up spool 66 must rotate is dependent upon the current diameter of the accumulated ribbon on said spool. The number of steps required to advance the ribbon by four millimeters is directly proportional to the diameter of the take-up spool 66. Since the SLACK COUNT is derived from the average FEED COUNT, it can be used to compute an offset into a lookup table to obtain the ribbon motor step time. The table of FIG. 10 contains the precalculated ribbon motor step time values.

Figure 6A:
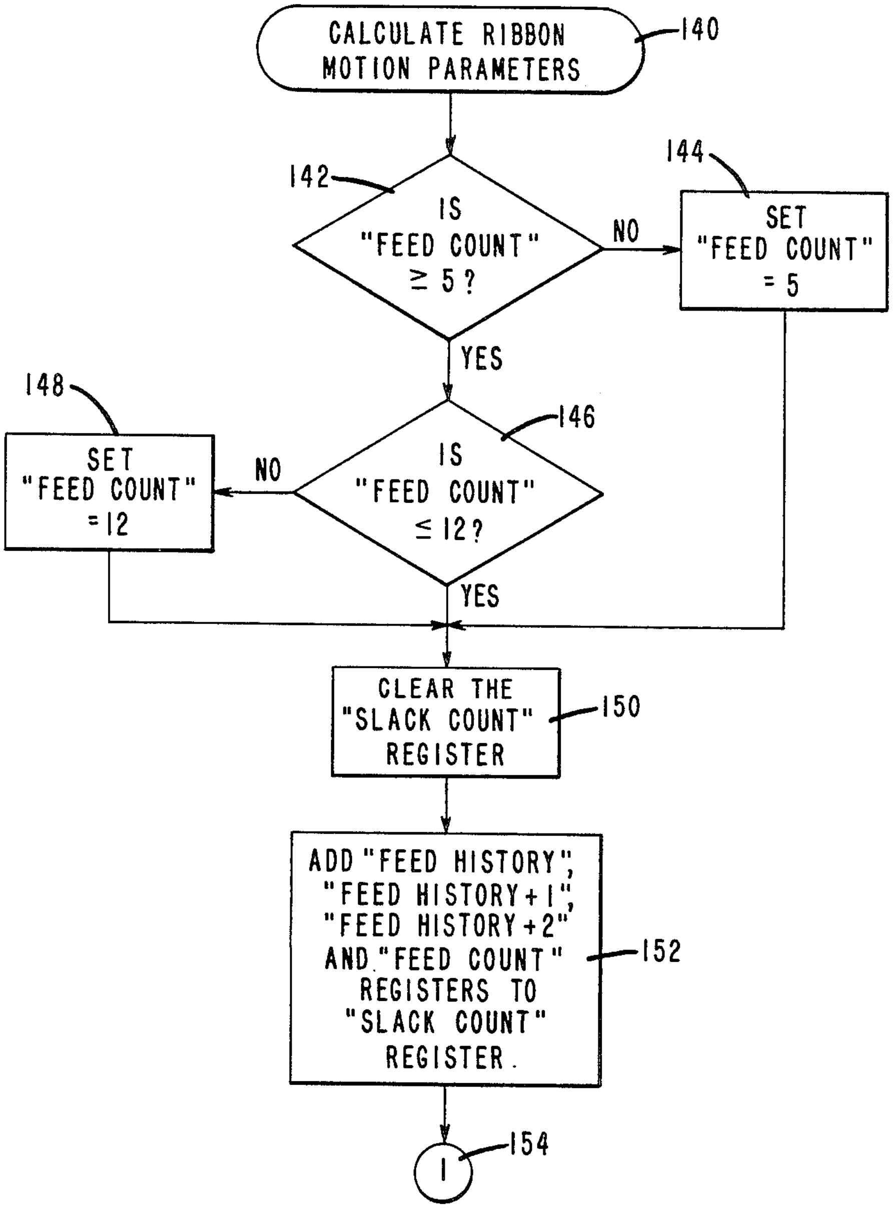
FIGS. 6A and 6B together show a flow diagram illustrating the "Calculate Ribbon Motion Parameters" routine used in controlling movement of the thermal transfer ribbon.
Figure 6B:
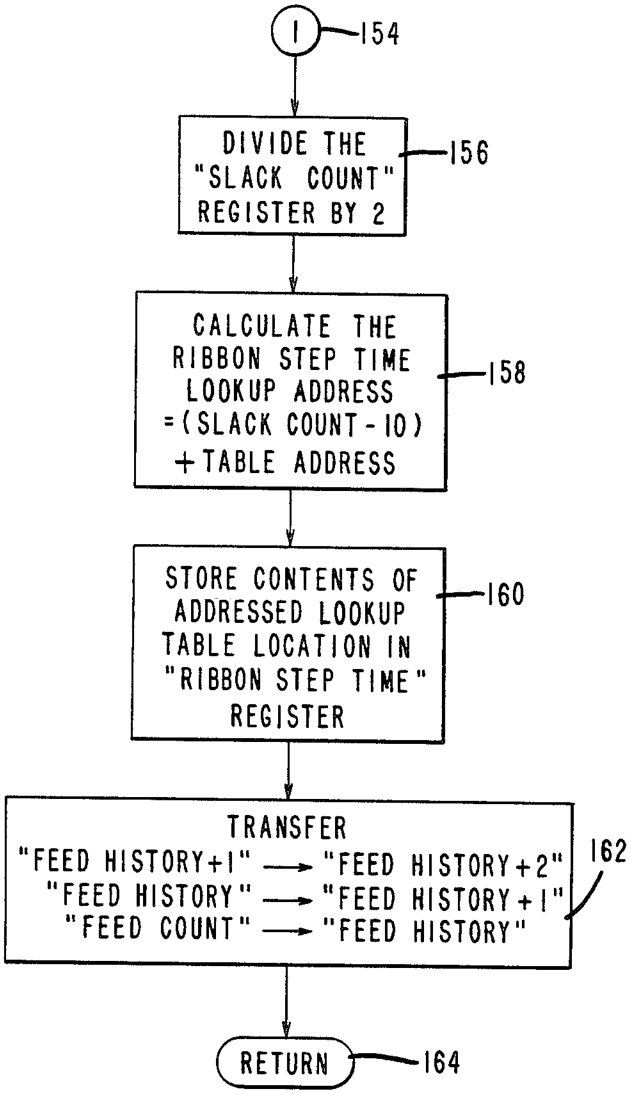

FIGS. 6A and 6B, taken together, comprise a flow diagram illustrating the "Calculate Ribbon Motion Parameters" routine which computes the SLACK COUNT and then looks up the required motor step time. The routine first verifies that the previous FEED COUNT falls within acceptable limits. Entry into the routine is represented by block 140 and the verification of the FEED COUNT is represented by blocks 142, 144, 146 and 148. As previously described, the minimum number of steps that should be required is five, when the take-up spool 66 is nearly full. When said spool is nearly empty, no more than twelve steps should be required to advance the ribbon. It will be noted that if the feed count is outside of either of these limits, it is forced to the closest limit; that is, at least five and no more than twelve.

Blocks 150, 152 (FIG. 6A) and 156 (FIG. 6B)(joined by connecting symbol 154) show how the slack count is computed. First the SLACK COUNT register is cleared (block 150), and then the FEED COUNTS for the four most recent four millimeter advancements are added to the SLACK COUNT register (block 152). The feed counts for the most recent advancements are contained in the FEED COUNT, FEED HISTORY, FEED HISTORY+1 and FEED HISTORY+2 registers, so that the FEED COUNT register contains the most recent advance step count. The contents of these registers are added together and the total is divided by two to yield the final SLACK COUNT (block 156). It will be noted that this operation will produce the same result as multiplying the average FEED COUNT by two.

The next step (block 158) is to use the SLACK COUNT to compute a lookup offset address to access the ribbon motor step time lookup table (FIG. 10). The quantity ten is subtracted from the slack count to provide the offset, since the minimum feed count is five and therefore the slack count will never be less than ten (two times five), which makes an offset of zero possible. The result is added to the starting address in memory of the look up table to obtain the address of the required RIBBON STEP TIME. The appropriate time value thus obtained can be loaded into the RIBBON STEP TIME register, as shown in block 160.

The final task in this subroutine is to update the FEED HISTORY registers, as shown in block 162. The value in the FEED HISTORY+1 register is copied into the FEED HISTORY+2 register; the value in the FEED HISTORY register is copied into the FEED HISTORY+1 register; and the value in the FEED COUNT register is copied into the FEED HISTORY register The subroutine is exited at block 164.

Figure 7:
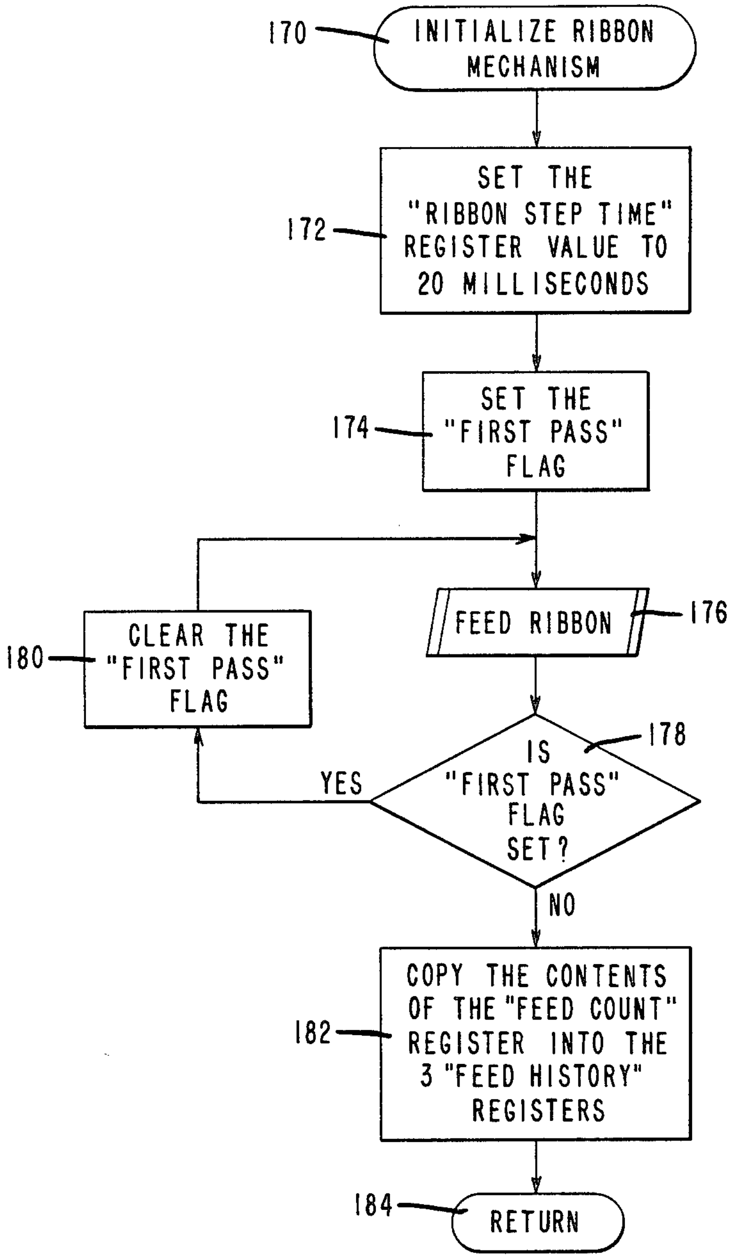
FIG. 7 shows a flow diagram illustrating the "Initialize Ribbon Mechanism" routine.

The "Initialize Ribbon Mechanism" subroutine of FIG. 7 is entered at block 170. This subroutine is called on power up, immediately following a ribbon change, and immediately following the repairing of a torn ribbon 52. The purpose of the subroutine is to determine how many steps of the ribbon motor 82 are required to advance the ribbon 52 by four millimeters when the diameter of the take-up spool 66 is unknown.

As shown in block 172, the RIBBON STEP TIME register is loaded with a timer value equivalent to 20 milliseconds. By stepping the ribbon 52 at this relatively slow rate, the speed at which the ribbon drives the metering device 62 will be well within safe operating limits. When the ribbon is taut between the supply spool 60 and the take-up spool 66, there will be no slippage between the ribbon and metering roller 100.

The calibration operation is accomplished by a loop of two cycles shown in blocks 174, 176, 178 and 180. In the loop, a call is made to the "Feed Ribbon" subroutine (block 176), to be subsequently described, which steps the ribbon motor 82 until it counts twelve feedback pulses from the ribbon metering device 62, corresponding to four millimeters of ribbon advancement. A flag "First Pass" is incorporated in the subroutine to count the two separate "Feed Ribbon" calls for the two cycles, as shown in blocks 174, 178 and 180. The ribbon advance of the first cycle is done to insure that the ribbon 52 is being held taut between the supply spool 60 and the take-up spool 66. The ribbon advance of the second cycle is done to measure the number of motor steps required to advance the ribbon 52 by four millimeters.

The final operation of this initialization subroutine, as shown in block 182, is to provide simulated data for the feed history, as required by the "Calculate Ribbon Motion Parameters" subroutine. As previously mentioned, the feed history registers are required in the calculation of the slack count value at the beginning of each ribbon cycle. To simulate this history, the value in the FEED COUNT register is copied into each of the three feed history registers: FEED HISTORY, FEED HISTORY+1, and FEED HISTORY+2. The subroutine is then exited at block 184.

Figure 8:
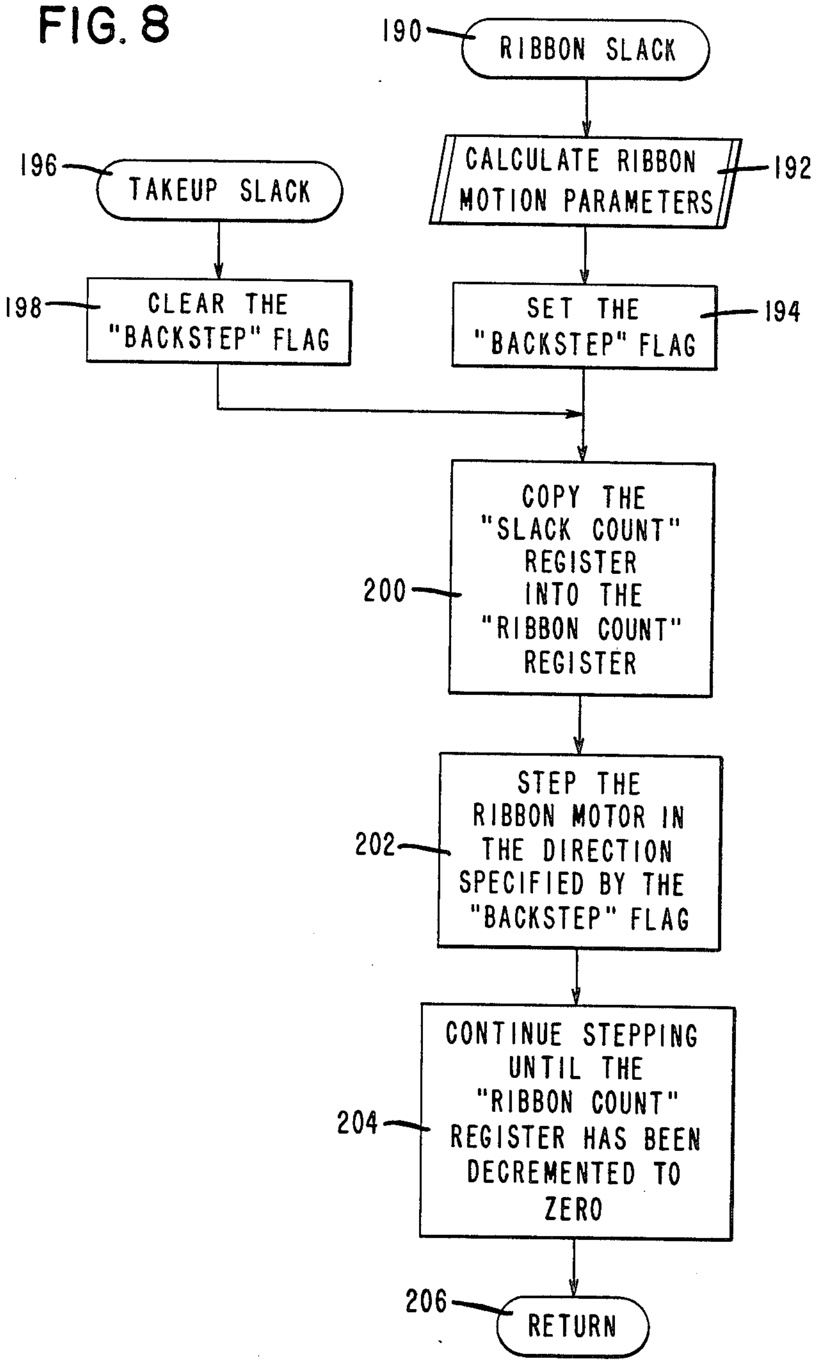
FIG. 8 shows a flow diagram illustrating the "Ribbon Slack" and "Takeup Slack" routines for providing and removing slack in the thermal print head.
Figure 9:
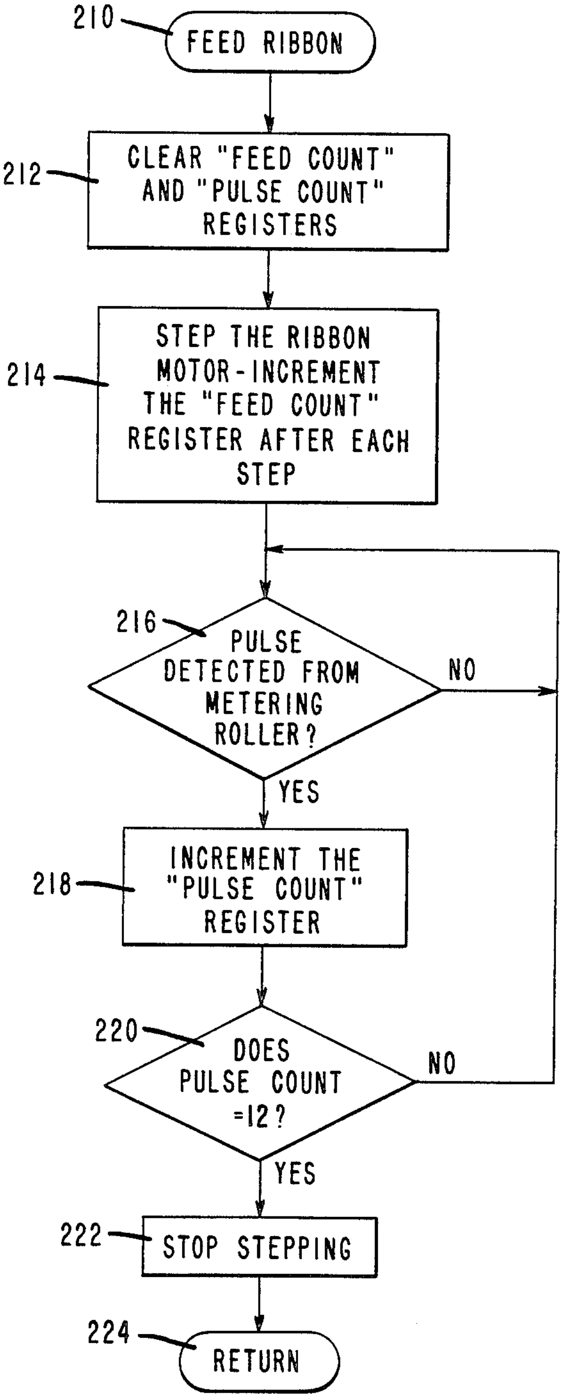
FIG. 9 shows a flow diagram illustrating the "Feed Ribbon" subroutine.

Three different operations are required to control the movement of the ribbon 52. These are handled by two firmware subroutines, which are shown in FIGS. 8 and 9. The subroutine of FIG. 8 controls the input and remove ribbon slack operations. The subroutine of FIG. 9 is used to perform a four millimeter ribbon advance which provides a fresh segment of ribbon 52 for the next document or field to be printed.

The slack control subroutine illustrated in FIG. 8 has two entry points designated "Ribbon Slack" (block 190) and "Take-up Slack" (block 196). The "Ribbon Slack" entry point is called immediately prior to printing a field, after the document 34 is in position and while the thermal printhead 56 is being moved toward the print position. As previously mentioned, slack in the ribbon 52 is necessary to allow the thermal printhead 56 to rise over the print field without dragging or tearing the ribbon 52. In the illustrated embodiment, eight millimeters of ribbon slack is provided. The "Take-up Slack" entry point is called to rewind the eight millimeters of slack ribbon 52. This operation also assists in the peel back of the ribbon 52 from the document 34.

Upon entering the "Ribbon Slack" subroutine at block 190, the "Calculate Ribbon Motion Parameters" subroutine is called upon, as represented by block 192, to compute the SLACK COUNT and then to look up the appropriate ribbon step time. Following the set-up of these ribbon control variables, a flag called "Backstep" is set (block 194). This flag, as the name suggests, sets the direction of rotation of the ribbon step motor 82 so that the take-up spool 66 of the ribbon mechanism will be reversed or "backed-up", to provide slack in the ribbon 52.

In block 200, the content of the SLACK COUNT register is copied into the STEP COUNT register. The step time is contained in the RIBBON STEP TIME register which was set by the "Calculate Ribbon Motion Parameters" subroutine of FIGS. 6A and 6B. The ribbon step motor 82 begins stepping, moving the ribbon 52 in the direction specified by the "Backstep" flag, as shown in block 202. After each step, the STEP COUNT register is decremented by one. As indicated in block 204, stepping continues until the step count is reduced to zero. At this time, eight millimeters of ribbon 52 has been either rolled on to or off of the take-up spool 66, depending upon the status of the "Backstep" flag. The routine is exited at block 206.

When the subroutine of FIG. 8 is entered at the "Takeup Slack" entry point (block 196), the "Backstep" flag is cleared (block 198). The subroutine then proceeds to rewind the ribbon 52 which was backed off of the take-up spool 66 by the "Ribbon Slack" operation. From this point, the process proceeds through the steps represented by blocks 200, 202, 204 and 206, as described above.

Illustrated in FIG. 9 is the "Feed Ribbon" subroutine which is used to advance the ribbon 52 by four millimeters following a print operation. A register called PULSE COUNT is used to count the number of pulses coming from the ribbon metering device 62. Twelve feedback pulses are approximately equal to four millimeters of ribbon advancement. As the ribbon 52 is advanced, the number of motor steps taken are counted, using the FEED COUNT register.

Upon entry into the subroutine of FIG. 9 at block 210, both the FEED COUNT and PULSE COUNT registers are set to zero (block 212), after which the ribbon advance begins (block 214). The ribbon motor 82 is stepped at a rate dictated by the contents of the RIBBON STEP TIME register. Each time a step is taken, the FEED COUNT register is incremented by one. While the ribbon motor 82 is being stepped, feedback from the ribbon metering device 62 is monitored, as shown by blocks 216, 218 and 220. Each time a feedback pulse is detected, the PULSE COUNT register is incremented by one. Cycling through the counting loop continues until a pulse count of 12 is reached (block 220), at which time the subroutine passes to block 222, where the step motor 82 is halted. Having completed the four millimeter ribbon advance, the subroutine is exited at block 224.

While the form of the invention illustrated and described herein is admirably adapted to fulfill the objects aforesaid, it is to be understood that other and further modifications within the scope of the appended claims may be made without departing from the spirit of the invention.

What is claimed is:

1. A recording apparatus comprising, in combnation:

a track in which a document tobe recorded upon may travel;

a platen engageable with said document when said document is in recording position;

a movable recording head capable of moving in operative relation to said platen in a first recording direction and in a second return direction, for recording on said document;

a ribbon take-up spool, a ribbon supply spool, and an ink donor ribbon extending therebetween and extending across said recording head between said recording head and the document to be recorded upon;

stepping motor means for driving said ribbon take-up spool;

sensing means for sensing and measuring the movement of said ribbon for said supply spool to said take-up spool; and control means coupled to said sensing means for controlling the operation of said stepping motor means and said recording head, and including means for reversing the movement of said take-up spool to provide a predetermined amount of slack in said ribbon during each printing operation, and also including means for determining the number of steps taken by said stepping motor means in a reverse direction by utilizing the number of steps taken by said stepping motor means in a plurality of movements of given distance of the ribbon measured by said sensing means during recording operations, said slack being provided to prevent smudging of the transferred ink on the document by the ribbon or breaking of the ribbon during the movement in recording direction by said recording head.

2. The recording apparatus of claim 1 in which the recording head is a thermal recording head and the ribbon is a thermal transfer ribbon.

3. The recording apparatus of claim 2 in which the path of the ribbon is configured to provide a peel-back angle of the ribbon from the thermal recording head of more than ninety degrees.

4. The recording apparatus of claim 3 in which the supply spool is located at a lower level than the recording head and in which the path of the ribbon extends across the recording head from bottom to top.

5. The recording apparatus of claim 3 in which the recording head extends upwardly above the indicia to be recorded on the document a relatively small amount so as to facilitate peeling back of the ribbon from the thermal recording head.

6. The recording apparatus of claim 3 in which a protective cover having a smooth surface is provided for the recording head to facilitate passage of the ribbon thereover.

7. The recording apparatus of claim 1 in which the sensing means comprises a roller element having a surface engaging the ribbon for rotation of the element, and having indicia on said element, and further comprises a sensing device positioned to sense the indicia as the roller element is rotated by movement of the ribbon to determine the amount of movement of the ribbon.

8. The recording apparatus of claim 7 in which the motor means is a stepping motor.

9. The recording apparatus of claim 7 in which said indicia comprise a plurality of lines parallel to the axis of rotation of the roller element and in which said sensing device comprises a photodiode and phototransistor pair.

10. The recording apparatus of claim 1, also including frame means for receiving the ribbon take-up spool and the ribbon supply spool.

11. The recording apparatus of claim 10, also including a braking mechanism for said ribbon supply spool comprising metal leaf spring means fixed to said frame means and normally in contact with a peripheral surface of said supply spool.

12. The recording apparatus of claim 11, in which said metal leaf spring means includes a pair of opposing arcuate portions adapted to engage said peripheral surface of said supply spool.

13. The recording apparatus of claim 1, in which said control means also includes means operative following the reversing movement of the take-up spool for advancing said take-up spool an amount equal to the reversing movement of the take-up spool to take up said slack in said ribbon.

14. A thermal printing apparatus comprising, in combination:

a track in which a document to be recorded upon may travel;

a platen engageable with said document when said document is in printing position;

a movable thermal print head capable of moving in operative relation to said platen in a direction of movement perpendicular to the direction of movement of said document in said track to provide at least one line of indicia on said document, in a first printing direction, and in a second return direction, for printing on said document;

a ribbon take-up spool, a ribbon supply spool, and a thermal transfer ribbon extending therebetween and extending across said thermal print head between said thermal print head and said document to be recorded upon;

stepping motor means for driving said ribbon take-up spool;

sensing means for sensing and measuring the movement of said ribbon from said supply spool to said take-up spool; and control means coupled to said sensing means for controlling the operation of said stepping motor means and said thermal print head, and including means for reversing the movement of said take-up spool to provide a predetermined amount of slack in said ribbon during each printing operation, and also including means for determining the number of steps taken by said stepping motor means in a reverse direction by utilizing the number of steps taken by said stepping motor means in a plurality of movements of given distance of the ribbon measured by said sensing means during recording operations, said slack being provided to prevent smudging of the document by the ribbon or breaking of the ribbon during the movement in printing direction by said thermal print head.

15. The thermal printing apparatus of claim 14, in which said control means also includes means operative following the reversing movement of the take-up spool for advancing said take-up spool an amount equal to the reversing movement of said take-up spool to take up said slack in said thermal transfer ribbon.

16. A method of thermal recording employing a thermal transfer ribbon carrying ink material which is transferred to a document by thermal means, comprising the following steps:

(a) advancing the ribbon a predetermined amount in a recording direction by a stepping motor during each recording operation to provide a fresh ribbon for the transferral of ink to a document to be recorded upon;

(b) sensing and measuring the number of steps of the stepping motor required for movement of the ribbon a given distance in said recording direction; and (c) reversing the ribbon by a predetermined amount during each recording cycle by operation of the stepping motor in a reverse direction a number of steps determined by utilizing the number of steps taken by the stepping motor for movement of the ribbon a given distance in said recording direction, to provide ribbon slack for the prevention of document smudging and ribbon breakage.

17. The method of claim 16, also including the steps, following the reversing of the ribbon, of advancing the ribbon an amount equal to said reversing movement to take up slack in the ribbon.

* * * * *